(12) United States Patent
Chang et al.

(10) Patent No.: US 11,283,110 B2
(45) Date of Patent: Mar. 22, 2022

(54) ELECTROLYTE COMPOSITION AND METAL-ION BATTERY EMPLOYING THE SAME

(71) Applicant: Industrial Technology Research Institute, Hsinchu (TW)

(72) Inventors: Che-Wei Chang, Taichung (TW); Chun-Tsung Hsu, Tainan (TW); Hsiao-Wen Huang, Kaohsiung (TW); Ping-I Pan, Tainan (TW); Chien-Chih Chiang, New Taipei (TW); Chang-Chung Yang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 155 days.

(21) Appl. No.: 16/706,961

(22) Filed: Dec. 9, 2019

(65) Prior Publication Data

US 2020/0212489 A1 Jul. 2, 2020

Related U.S. Application Data

(60) Provisional application No. 62/785,308, filed on Dec. 27, 2018.

(30) Foreign Application Priority Data

Dec. 2, 2019 (TW) ................................ 108143942

(51) Int. Cl.
*H01M 6/04* (2006.01)
*H01M 10/0568* (2010.01)
(Continued)

(52) U.S. Cl.
CPC ....... *H01M 10/0568* (2013.01); *H01M 4/366* (2013.01); *H01M 4/38* (2013.01);
(Continued)

(58) Field of Classification Search
CPC ......... H01M 10/0568; H01M 10/0567; H01M 4/366; H01M 4/38; H01M 4/48; H01M 4/583; H01M 2004/027; H01M 2004/028
See application file for complete search history.

(56) References Cited

U.S. PATENT DOCUMENTS 9,297,091 B2  3/2016  Sakaida et al.
9,882,239 B2  1/2018  Yu et al.
(Continued)

FOREIGN PATENT DOCUMENTS

CN      1215595 C    8/2006
CN    101510622 A    8/2009
(Continued)

OTHER PUBLICATIONS

CN101510622A translation (Year: 2009).*
(Continued)

*Primary Examiner* — Jane J Rhee
(74) *Attorney, Agent, or Firm* — Birch, Stewart, Kolasch & Birch, LLP

(57) ABSTRACT

An electrolyte composition and a metal-ion battery employing the same are provided. The electrolyte composition includes a metal salt of Formula (I), an ionic liquid, and an additive $$M_iX_j \qquad \text{Formula (I),}$$

wherein M can be lithium ion, sodium ion, potassium ion, beryllium ion, magnesium ion, calcium ion, scandium ion, yttrium ion, titanium ion, zirconium ion, hafnium ion, vanadium ion, niobium ion, tantalum ion, chromium ion, molybdenum ion, tungsten ion, manganese ion, technetium ion, rhenium ion, iron ion, ruthenium, osmium ion, cobalt ion, rhodium ion, iridium ion, nickel ion, palladium ion, platinum ion, copper ion, silver ion, gold ion, zinc ion, cadmium ion, mercuric ion, indium ion, thallium ion, tin ion, lead ions, (Continued)

arsenic ions, antimony ions, bismuth ion, gallium ion, or aluminum ion; $X^-$ can be $F^-$, $Cl^-$, $Br^-$, $I^-$, $BF_4^-$, $PF_6^-$, $[(CF_3SO_2)_2N]^-$, $CF_3SO_3^-$, $NO_3^-$, $CH_3CO_2^-$, $SO_4^{2-}$, $C_2O_4^{2-}$, or $[B(C_2O_4)_2]^-$; and i is 1, 2, 3, 4, 5, or 6; and j is 1, 2, 3, 4, 5, or 6. The additive includes a substituted or unsubstituted $C_5$-$C_{30}$ nitrogen-containing heterocyclic compound.

15 Claims, 2 Drawing Sheets

(51) Int. Cl.
| | | |
|---|---|---|
| *H01M 10/0567* | (2010.01) | |
| *H01M 4/583* | (2010.01) | |
| *H01M 4/48* | (2010.01) | |
| *H01M 4/38* | (2006.01) | |
| *H01M 4/36* | (2006.01) | |
| *H01M 4/02* | (2006.01) | |

(52) U.S. Cl.
CPC ............ *H01M 4/48* (2013.01); *H01M 4/583* (2013.01); *H01M 10/0567* (2013.01); *H01M 2004/027* (2013.01); *H01M 2004/028* (2013.01)

(56) References Cited

U.S. PATENT DOCUMENTS

| | | |
|---|---|---|
| 10,003,078 B2 | 6/2018 | Zhamu et al. |
| 2017/0028827 A1 | 10/2017 | Pino Martinez et al. |
| 2017/0338514 A1 | 11/2017 | Chiang et al. |
| 2018/0138554 A1 | 5/2018 | Mukherjee et al. |
| 2018/0219257 A1 | 8/2018 | Huang et al. |

FOREIGN PATENT DOCUMENTS

| | | |
|---|---|---|
| CN | 104518239 A | 4/2015 |
| CN | 106471660 A | 3/2017 |
| CN | 107636871 A | 1/2018 |
| CN | 108321433 A | 7/2018 |
| CN | 108736065 A | 11/2018 |
| CN | 109962289 A | 7/2019 |
| EP | 1 317 013 A1 | 6/2003 |
| JP | 5129497 B2 | 1/2013 |
| JP | 5950162 B2 | 7/2016 |
| TW | 200607142 A | 2/2006 |

OTHER PUBLICATIONS

Chinese Office Action and Search Report for Chinese Application No. 201911273618.4, dated Dec. 14, 2020.
Taiwanese Office Action and Search Report for Taiwanese Application No. 108143942, dated Apr. 13, 2021.
Taiwanese Office Action Application and Search Report for Taiwanese Application No. 108143942 dated Jun. 10, 2020.
Barchi et al., Electroplated bright aluminium coatings for anticorrosion and decorative purposes, Progress in Organic Coatings, vol. 67, 2010, pp. 146-151.
Lin et al., "An ultrafast rechargeable aluminium-ion battery," Nature, vol. 520, Apr. 16, 2015, pp. 325-328 (16 pages total).
Qingfeng et al., "Electrochemical Deposition of Aluminum from NaCl—$AlCl_3$ Melts," J. Electrochem. Soc., vol. 137, No. 2, Feb. 1990, pp. 593-598.
Xu et al., "Lithium metal anodes for rechargeable batteries," Energy & Environmental Science, vol. 7, 2014, pp. 513-537.

* cited by examiner

ELECTROLYTE COMPOSITION AND METAL-ION BATTERY EMPLOYING THE SAME

CROSS REFERENCE TO RELATED APPLICATIONS

This application claims the benefit of U.S. Provisional Application No. 62/785,308, filed on Dec. 27, 2018, which is hereby incorporated herein by reference.

This Application claims priority of Taiwan Patent Application No. 108143942, filed on Dec. 2, 2019, the entirety of which is incorporated by reference herein.

TECHNICAL FIELD

The disclosure relates to an electrolyte composition and a metal-ion battery employing the same.

BACKGROUND

The electrolyte composition used in some conventional metal-ion batteries may include ionic liquid. Some aluminum-ion batteries employ an electrolyte composition that includes aluminum chloride and imidazolium chloride. The conventional electrolyte composition, which employs aluminum chloride and imidazolium chloride, exhibits good electrochemical reversibility and can be used in an aluminum-ion battery to stably execute the charging and discharging cycles. However, after numerous charging and discharging cycles, the metal material on the surface of the negative electrode in the battery grows in a specific direction. This is due to the numerous depositions and dissolutions, and can result in a dendritic growth on the negative surface. In additional, the self-corrosion effect of the negative electrode is caused by contact with the ionic liquid. The consumption of the aluminum negative electrode is increased, resulting in cycling instability and a short lifespan of the battery.

Therefore, the industry needs a novel electrolyte composition to overcome the problems mentioned above.

SUMMARY

According to embodiments of the disclosure, the disclosure provides a electrolyte composition, includes a metal salt having a structure represented by Formula (I), an ionic liquid, and an additive $$M_iX_j \qquad \text{Formula (I)},$$

wherein M is lithium ion, sodium ion, potassium ion, beryllium ion, magnesium ion, calcium ion, scandium ion, yttrium ion, titanium ion, zirconium ion, hafnium ion, vanadium ion, niobium ion, tantalum ion, chromium ion, molybdenum ion, tungsten ion, manganese ion, technetium ion, rhenium ion, iron ion, ruthenium ion, osmium ion, cobalt ion, rhodium ion, iridium ion, nickel ion, palladium ion, platinum ion, copper ion, silver ion, gold ion, zinc ion, cadmium ion, mercuric ion, indium ion, thallium ion, tin ion, lead ion, arsenic ion, antimony ion, bismuth ion, gallium ion, or aluminum ion; X is $F^-$, $Cl^-$, $Br^-$, $I^-$, $BF_4^-$, $PF_6^-$, $[(CF_3SO_2)_2N]^-$, $CF_3SO_3^-$, $NO_3^-$, $CH_3CO_2^-$, $SO_4^{2-}$, $C_2O_4^{2-}$, or $[B(C_2O_4)_2]^-$; and, i is 1, 2, 3, 4, 5, or 6; j is 1, 2, 3, 4, 5, or 6. The additive includes substituted or unsubstituted $C_5$-$C_{30}$ nitrogen-containing heterocyclic compound.

According to embodiments of the disclosure, the disclosure provides a metal-ion battery. The metal-ion battery can include a positive electrode, a separator, a negative electrode, and the aforementioned electrolyte composition. The negative electrode can be separated from the positive electrode by the separator, and the electrolyte composition can be disposed between the positive electrode and the negative electrode.

A detailed description is given in the following embodiments with reference to the accompanying drawings.

DETAILED DESCRIPTION

The electrolyte composition and metal-ion battery of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In the drawings, the size, shape, or thickness of some of the elements may be exaggerated and not drawn on scale for illustrative purposes. The disclosure will be described with respect to particular embodiments and with reference to certain drawings but the disclosure is not limited thereto.

The disclosure provides an electrolyte composition and a metal-ion battery employing the same. According to embodiments of the disclosure, besides a metal salt and an ionic liquid, the electrolyte composition of the disclosure further includes an additive with a specific structure. By means of the addition of the additive, during the charging/discharging of the battery (such as aluminum-ion battery), the electric field uniformity of the surface of the metal electrode (such as the aluminum electrode of the aluminum-ion battery) can be achieved, thereby improving the deposition uniformity of the metal electrode, facilitating the inhibition of dendrite growth on the surface of the metal electrode, and improving the self-corrosion effect occurred on the surface of the aluminum electrode. As a result, the metal-ion battery, employing the electrolyte composition, can have enhanced characteristics and prolonged lifespan.

According to embodiments of the disclosure, the electrolyte composition of the disclosure includes a metal salt having a structure represented by Formula (I), an ionic liquid, and an additive, $$M_iX_j \qquad \text{Formula (I)},$$

wherein M is lithium ion, sodium ion, potassium ion, beryllium ion, magnesium ion, calcium ion, scandium ion, yttrium ion, titanium ion, zirconium ion, hafnium ion, vanadium ion, niobium ion, tantalum ion, chromium ion, molybdenum ion, tungsten ion, manganese ion, technetium ion, rhenium ion, iron ion, ruthenium ion, osmium ion, cobalt ion, rhodium ion, iridium ion, nickel ion, palladium ion, platinum ion, copper ion, silver ion, gold ion, zinc ion, cadmium ion, mercuric ion, indium ion, thallium ion, tin ion, lead ion, arsenic ion, antimony ion, bismuth ion, gallium ion, or aluminum ion; X is $F^-$, $Cl^-$, $Br^-$, $I^-$, $BF_4^-$, $PF_6^-$, $[(CF_3SO_2)_2N]^-$, $CF_3SO_3^-$, $NO_3^-$, $CH_3CO_2^-$, $SO_4^{2-}$, $C_2O_4^{2-}$, $[B(C_2O_4)_2]^-$; and, i is 1, 2, 3, 4, 5, or 6. The molar ratio of the metal salt to the ionic liquid can be greater than or equal to 1.0, such as from 1.0 to 2.05, or from 1.1 to 2.0.

For example, the metal salt can be LiCl, $LiBF_4$, $LiPF_6$, $LiNO_3$, $LiCH_3CO_2$, $Li[B(C_2O_4)_2]$, NaCl, $NaBF_4$, $NaPF_6$, $Na_2SO_4$, $Na_2C_2O_4$, KCl, $BeCl_2$, $MgCl_2$, $CaCl_2$), $ScCl_3$, $YCl_3$, $TiCl_2$, $TiCl_3$, $TiCl_4$, $ZrCl_4$, $HfCl_4$, $VCl_2$, $VCl_3$, $VCl_4$, $VCl_5$, $NbCl_5$, $TaCl_5$, $CrCl_2$, $CrCl_3$, $MoCl_3$, $MoCl_5$, $WCl_5$, $WCl_6$, $MnCl_2$, $TcCl_4$, $ReCl_3$, $FeCl_2$, $FeCl_3$, $RuCl_3$, $OsCl_4$, $COCl_2$, $RhCl_3$, $IrCl_4$, $NiCl_2$, $NiSO_4$, $PdCl_2$, $PtCl_2$, $PtCl_4$, CuCl, $CuCl_2$, $CuSO_4$, AgCl, $AuCl_3$, $ZnCl_2$, $ZnCl_4$, $CdCl_2$, $HgCl_2$, $Hg_2Cl_2$, $InCl_3$, TlCl, $SnCl_4$, $PbCl_4$, $AsCl_3$, $SbCl_3$, $SbCl_5$, $BiCl_3$, $GaCl_3$, $AlF_2$, $AlF_3$, $AlCl_2$, $AlCl_3$, $AlBr_2$, $AlBr_3$, $AlI_2$, $AlI_3$, $Al(BF_4)_2$, $Al(BF_4)_3$, $Al(PF_6)_2$, $Al(PF_6)_3$, $Al[(CF_3SO_2)_2N]_2$, $Al[(CF_3SO_2)_2N]_3$, $Al(CF_3SO_3)_2$, $Al(CF_3SO_3)_3$, or a combination thereof. In some embodiments, the metal salt can be $AlCl_3$.

According to embodiments of the disclosure, the ionic liquid can have a structure represented by Formula (II):

$$[A]_k[B]_l \qquad \text{Formula (II)},$$

wherein A can be imidazolium cation, pyrrolium cation, pyrrolinium cation, pyrrolidinium cation, pyridinium cation, ammonium cation, indazolium cation, pyrimidinium cation, azaannulenium cation, azathiazolium cation, benzimidazolium cation, benzofuranium cation, benzotriazolium cation, borolium cation, cholinium cation, cinnolinium cation, diazabicyclodecenium cation, diazabicyclononenium cation, diazabicyclo-undecenium cation, dithiazolium cation, furanium cation, guanidinium cation, indolinium cation, indolium cation, morpholinium cation, oxaborolium cation, oxaphospholium cation, oxazinium cation, oxazolium cation, iso-oxazolium cation, oxathiazolium cation, phospholium cation, phosphonium cation, phthalazinium cation, piperazinium cation, piperidinium cation, pyranium cation, pyrazinium cation, pyrazolium cation, pyridazinium cation, quinazolinium cation, quinolinium cation, iso-quinolinium cation, quinoxalinium cation, selenozolium cation, sulfonium cation, tetrazolium cation, iso-thiadiazolium cation, thiazinium cation, thiazolium cation, thiophenium cation, thiuronium cation, triazadecenium cation, triazinium cation, triazolium cation, iso-triazolium cation, or uronium cation; B can be $F^-$, $Cl^-$, $Br^-$, $I^-$, $BF_4^-$, $PF_6^-$, $[(CF_3SO_2)_2N]^-$, $CF_3SO_3^-$, $NO_3^-$, $CH_3CO_2^-$, $SO_4^{2-}$, $C_2O_4^{2-}$, or $[B(C_2O_4)_2]^-$; and, k can be 1, 2, 3, 4, 5, or 6; l can be 1, 2, 3, 4, 5, or 6.

For example, the ionic liquid can be imidazolium chloride (such as alkylimidazolium chloride), pyrrolium chloride (such as alkylpyrrolium chloride), pyrrolinium chloride (such as alkylpyrrolinium chloride), pyrrolidinium chloride (such as alkylpyrrolidinium chloride), pyridinium chloride (such as alkylpyridinium chloride), ammonium chloride (such as alkylammonium chloride), indazolium chloride (such as alkylindazolium chloride), pyrimidinium chloride (such as alkylpyrimidinium chloride), azaannulenium chloride (such as alkylazaannulenium chloride), azathiazolium chloride (such as alkylazathiazolium chloride), benzimidazolium chloride (such as alkylbenzimidazolium chloride), benzofuranium chloride (such as alkylbenzofuranium chloride), benzotriazolium chloride (such as alkylbenzotriazolium chloride), borolium chloride (such as alkylborolium chloride), cholinium chloride (such as (alkylcholinium chloride), cinnolinium chloride (such as alkylcinnolinium chloride), diazabicyclodecenium chloride (such as alkyldiazabicyclodecenium chloride), diazabicyclononenium chloride (alkyldiazabicyclononenium chloride), diazabicyclo-undecenium chloride (such as alkyldiazabicyclo-undecenium chloride), dithiazolium chloride (such as alkyldithiazolium chloride), furanium chloride (such as alkylfuranium chloride), guanidinium chloride (such as alkylguanidinium chloride), indolinium chloride (such as alkylindolinium chloride), indolium chloride (such as alkylindolium chloride), morpholinium chloride (such as alkylmorpholinium chloride), oxaborolium chloride (such as alkyloxaborolium chloride), oxaphospholium chloride (such as alkyloxaphospholium chloride), oxazinium chloride (such as alkyloxazinium chloride), oxazolium chloride (such as alkyloxazolium chloride), iso-oxazolium chloride (such as alkyliso-oxazolium chloride), oxathiazolium chloride (such as alkyloxathiazolium chloride), pentazolium chloride (such as alkylpentazolium chloride), phospholium chloride (such as alkylphospholium chloride), phosphonium chloride (such as alkylphosphonium chloride), phthalazinium chloride (such asalkylphthalazinium chloride), piperazinium chloride (such as alkylpiperazinium chloride), piperidinium chloride (such as alkylpiperidinium chloride), pyranium chloride (such asalkylpyranium chloride), pyrazinium chloride (such as alkylpyrazinium chloride), pyrazolium chloride (such as alkylpyrazolium chloride), pyridazinium chloride (such as alkylpyridazinium chloride), quinazolinium chloride (such as alkylquinazolinium chloride), quinolinium chloride (such as alkylquinolinium chloride), iso-quinolinium chloride (alkyliso-quinolinium chloride), quinoxalinium chloride (such as alkylquinoxalinium chloride), selenozolium chloride (such as alkylselenozolium chloride), sulfonium chloride (such as alkylsulfonium chloride), tetrazolium chloride (such as alkyltetrazolium chloride), iso-thiadiazolium chloride (such as alkyliso-thiadiazolium chloride), thiazinium chloride (such as alkylthiazinium chloride), thiazolium chloride (such as alkylthiazolium chloride), thiophenium chloride (such as alkylthiophenium chloride), thiuronium chloride (such as alkylthiuronium chloride), triazadecenium chloride (such asalkyltriazadecenium chloride), triazinium chloride (such as alkyltriazinium chloride), triazolium chloride (such as alkyltriazolium chloride), iso-triazolium chloride (such as alkyliso-triazolium chloride), or uronium chloride (such as alkyluronium chloride). In some embodiments, the ionic liquid can be 1-ethyl-3-methylimidazolium chloride ($[EMI^+][Cl^-]$), 1-butyl-3-methylimidazolium chloride ($[BMI^+][Cl^-]$), or a combination thereof.

According to embodiments of the disclosure, the additive can include a substituted or unsubstituted $C_5$-$C_{30}$ nitrogen-containing heterocyclic compound with a relatively high polarity. The unsubstituted $C_5$-$C_{30}$ nitrogen-containing heterocyclic compound can be pyrrole, pyrazole, imidazole, oxazole, isoxazole, thiazole, benzimdazole, pyridine, indole, indoline, carbazole, pyridazine, pyrimidine, pyrazine, purine, acridine, phenazine, phenothiazine, quinolone, iso-quinolone, pteridine, 1,10-phenanthroline, 1,7-phenanthroline, 4,7-phenanthroline, 3,4,7,8-tetramethyl-1,10-phenanthroline, 1,10-phenanthroline monohydrate, or 1,10-phenanthroline monohydrochloride monohydrate.

The substituted $C_5$-$C_{30}$ nitrogen-containing heterocyclic compound is a $C_5$-$C_{30}$ nitrogen-containing heterocyclic compound which has at least one hydrogen atom bonded to the carbon atom of the compound that is replaced with R, wherein R can be halogen, cyano group, $C_{1-10}$ alkyl group, $C_{1-10}$ alkoxy group, $C_{1-5}$ aminoalkyl group, —$NR^1R^2$, and wherein $R^1$, $R^2$, $R^3$, $R^4$, $R^5$, $R^6$, $R^7$, $R^8$, $R^9$, and $R^{10}$ are independently hydrogen or $C_{1-10}$ alkyl group.

When R is $C_{1-10}$ alkyl group, R can be linear or branched alkyl group, such as methyl, ethyl, propyl, butyl, pentyl, hexyl, heptyl, octyl, nonyl, decyl, or an isomer thereof. When R is $C_{1-10}$ alkoxy group, R can be linear or branched alkoxy group. For example, $C_{1-10}$ alkoxy group can be methoxy, ethoxy, propoxy, butoxy, pentoxy, hexoxy, heptoxy, octoxy, nonoxy, decoxy, or an isomer thereof. When R is $C_{1-5}$ aminoalkyl group, R can be linear or branched aminoalkyl group. For example, $C_{1-5}$ aminoalkyl group can be aminomethyl (with a structure of $NH_2CH_2$—), aminoethyl (with a structure of $NH_2C_2H_4$—), aminopropyl (with a structure of $NH_2C_3H_6$—), or an isomer thereof.

When $R^1$, $R^2$, $R^3$, $R^4$, $R^5$, $R^6$, $R^7$, $R^8$, $R^9$, or $R^{10}$ are independently $C_{1-10}$ alkyl group, $R^1$, $R^2$, $R^3$, $R^4$, $R^5$, $R^6$, $R^7$, $R^8$, $R^9$, or $R^{10}$ can be independently linear or branched alkyl group, such as methyl, ethyl, propyl, butyl, pentyl, hexyl, heptyl, octyl, nonyl, decyl, or an isomer thereof.

For example, the substituted $C_5$-$C_{30}$ nitrogen-containing heterocyclic compound can be 3,4,7,8-tetramethyl-1,10-phenanthroline, 4,7-dihydroxy-1,10-phenanthroline, 5,6-dimethyl-1,10-phenanthroline, 5-chloro-1,10-phenanthroline, 1,10-phenanthroline-5,6-dione, 4-pyridinecarboxylic acid hydrazide, 3-pyridinecarboxylic acid hydrazide, 4-pyridyl hydrazide, 4-pyridinecarboxaldehyde, 4-methoxypyridine, 3-methoxypyridine, 2-methoxypyridine, 4-aminopyridine, 4-(aminomethyl)pyridine, pyridine-4-carboxamide, pyridine-3-carboxamide, pyridine-2-carboxamide, pyridine-3-carboxylic acid, or 8-(4-dimethylaminophenyl)diazenyl-N,N-diethyl-10-phenylphenazin-10-ium-2-amine chloride (Janus Green B).

According to embodiments of the disclosure, the additive can include pyrrole, pyrazole, imidazole, oxazole, isoxazole, thiazole, benzimdazole, pyridine, indole, indoline, carbazole, pyridazine, pyrimidine, pyrazine, purine, acridine, phenazine, phenothiazine, quinolone, iso-quinolone, pteridine, 1,10-phenanthroline, 1,7-phenanthroline, 4,7-phenanthroline, 3,4,7,8-tetramethyl-1,10-phenanthroline, 1,10-phenanthroline monohydrate, 1,10-phenanthroline monohydrochloride monohydrate, 3,4,7,8-tetramethyl-1,10-phenanthroline, 4,7-dihydroxy-1,10-phenanthroline, 5,6-dimethyl-1,10-phenanthroline, 5-chloro-1,10-phenanthroline, 1,10-phenanthroline-5,6-dione, 4-pyridinecarboxylic acid hydrazide, 3-pyridinecarboxylic acid hydrazide, 4-pyridyl hydrazide, 4-pyridinecarboxaldehyde, 4-methoxypyridine, 3-methoxypyridine, 2-methoxypyridine, 4-aminopyridine, 4-(aminomethyl)pyridine, pyridine-4-carboxamide, pyridine-3-carboxamide, pyridine-2-carboxamide, pyridine-3-carboxylic acid, 8-(4-Dimethylaminophenyl)diazenyl-N,N-diethyl-10-phenylphenazin-10-ium-2-amine chloride (Janus Green B), or a combination thereof.

According to another embodiment of the disclosure, the additive can include 1,10-phenanthroline, 1,7-phenanthroline, 4,7-phenanthroline, 5-chloro-1,10-phenanthroline, 4-pyridinecarboxylic acid hydrazide, 8-(4-Dimethylaminophenyl)diazenyl-N,N-diethyl-10-phenylphenazin-10-ium-2-amine chloride (Janus Green B), pyridine-3-carboxylic acid, or a combination thereof.

According to embodiments of the disclosure, in the electrolyte composition of the disclosure, the molar ratio of the metal salt to the ionic liquid can be greater than or equal to 1.0, such as from 1.0 to 2.05, or from 1.1 to 2.0. For example, the molar ratio of the metal salt to the ionic liquid can be about 1.1, 1.2, 1.3, 1.4, 1.5, 1.6, 1.7, 1.8, 1.9, or 2.0. In addition, according to embodiments of the disclosure, the amount of additive can be 0.05 wt % to 20 wt %, based on the total weight of the metal salt and the ionic liquid. When the amount of additive is too low, it is equivalent to the condition which the composition is free of the additives, and the dendritic growth on the surface of the metal electrode and the electrode self-corrosion are observed. When the amount of additive is too high, the additive is not to apt to be dissolved in the mixture of the metal salt and the ionic liquid (i.e. cloudiness and/or precipitation in the electrolyte composition are observed), thereby reducing the conductivity of the electrolyte composition and reducing the capacity of the battery employing the electrolyte composition. In another embodiment, the amount of additive can be from 0.05 wt % to 15 wt %. In yet another embodiment, the amount of additive can be from 0.05 wt % to 10 wt %.

According to embodiments of the disclosure, the electrolyte composition of the disclosure can optionally further include a solvent in order to adjust the viscosity of the composition via dilution. The solvent also facilitates the injection of the composition into the battery to be disposed between the positive electrode and negative electrode during the package of the battery, thereby enhancing the transfer of ions. The solvent can be furan-based solvent, carbonate-based solvent, ester-based solvent, ether-based solvent, benzene-based solvent, nitrile-based solvent, amidine-based solvent, or ketone-based solvent. For example, the solvent can be tetrahydrofuran (THF), dimethyl ether, ethylene carbonate, propylene carbonate, dimethyl carbonate, diethyl carbonate, ethyl methyl carbonate, trimethyl phosphate, dimethoxyethane, toluene, acetonitrile, dimethyl sulfoxide, dimethylformamide, acetone, or a combination thereof.

Figure 1:
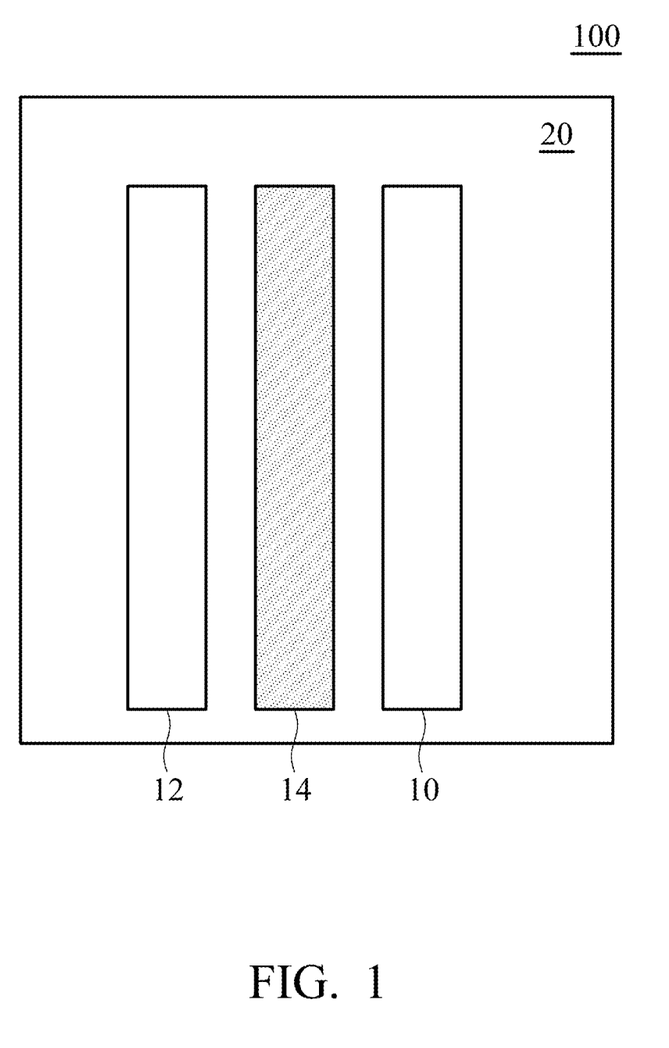
FIG. 1 is a schematic view of the metal-ion battery according to an embodiment of the disclosure.

According to embodiments of the disclosure, the disclosure also provides a metal-ion battery. As shown in FIG. 1 is a schematic view of the metal-ion battery 100 according to an embodiment of the disclosure. The metal-ion battery 100 can include a positive electrode 10, a negative electrode 12, and a separator 14, wherein the separator 14 can be disposed between the positive electrode 10 and the negative electrode 12 to separate the negative electrode 12 and the positive electrode 10 from each other, preventing the positive electrode 10 from coming into direct contact with the negative electrode 12. The metal-ion battery 100 further includes the aforementioned electrolyte composition 20 disposed between the positive electrode and the negative electrode in the battery. Thus, the electrolyte composition 20 comes into contact with the positive electrode 10 and the negative electrode 12. The metal-ion battery can be a rechargeable secondary battery or it can be a primary battery.

According to embodiments of the disclosure, the positive electrode 10 can contain a positive electrode current-collecting layer 11 and a positive electrode active material 13 which is disposed on the positive electrode current-collecting layer 11. According to embodiments of the disclosure, the positive electrode 10 can consist of the positive electrode current-collecting layer 11 and the positive electrode active material 13. The positive electrode current-collecting layer 11 can include conductive carbon substrate, metal material, metal material with a porous structure, or a combination thereof. The metal material can be, for example, aluminum, nickel, copper, and molybdenum. The conductive carbon substrate can be carbon cloth, carbon felt, or carbon paper. For example, the conductive carbon substrate can have a sheet resistance from about 1 $m\Omega \cdot cm^2$ to 6 $m\Omega \cdot cm^2$, and the carbon content of the conductive carbon substrate is greater than 65 wt %. According to embodiments of the disclosure, the metal material with a porous structure, such as three-dimensional network structure metal material (such as nickel mesh, copper mesh, or molybdenum mesh) or metal material with a foam structure (such as: nickel foam, copper foam, or molybdenum foam). According to embodiments of the disclosure, the metal material with a porous structure can have a porosity P from about 50% to 80% (such as about 60% or 70%). The porosity P can be determined by the following equation: $P=V1/V2\times 100\%$, wherein V1 is the volume of the pores of the positive electrode current-collecting layer, and V2 is the volume of the positive electrode current-collecting layer. According to embodiments of the disclosure, the positive electrode current-collecting layer can be a composite layer of the conductive carbon substrate and a metal material.

According to embodiments of the disclosure, the positive electrode active material can be layered carbon material, layered double hydroxide, layered oxide, layered chalcogenide, vanadium oxide, metal sulfide, an agglomerate thereof, or a combination thereof. According to embodiments of the disclosure, the layered carbon material can be graphite, carbon nanotube, graphene, or a combination thereof. According to embodiments of the disclosure, the layered carbon material can be intercalated carbon material, such as graphite (including natural graphite, artificial graphite, pyrolytic graphite, foamed graphite, flake graphite, or expanded graphite), graphene, carbon nanotube, or a combination thereof. According to embodiments of the disclosure, the positive electrode active material can grow directly on the positive electrode current-collecting layer, and there is no intermediate between the positive electrode active material and the positive electrode current-collecting layer. For example, the positive electrode active material can grow directly on the positive electrode current-collecting layer by chemical vapor deposition (CVD). Furthermore, the positive electrode active material can be affixed to the positive electrode current-collecting layer via an adhesive. The adhesive can be polyvinyl alcohol (PVA), polytetrafluoroethylene (PTFE), carboxymethyl cellulose sodium, polyvinylidene difluoride (PVDF), styrene-butadiene copolymer, fluorinated rubber, polyurethane, polyvinylpyrrolidone, poly(ethyl acrylate), polyvinyl chloride, polyacrylonitrile, polybutadiene, polyacrylic acid, or a combination thereof. According to embodiments of the disclosure, when the positive electrode current-collecting layer is metal material with a porous structure, the positive electrode active material can further fill into the pores of the metal material.

According to embodiments of the disclosure, suitable materials of the separator 14 can be glass fiber, polyethylene (PE), polypropylene (PP), nonwoven fabric, wood fiber, poly(ether sulfones) (PES), ceramic fiber, or a combination thereof.

According to embodiments of the disclosure, the negative electrode 12 includes a negative electrode active material, wherein the negative electrode active material can include a metal or an alloy of the metal, layered carbon material, layered double hydroxide, layered oxide, layered chalcogenide, vanadium oxide, metal sulfide, an agglomerate thereof, or a combination thereof. According to embodiments of the disclosure, the metal can be sodium, potassium, beryllium, magnesium, calcium, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, indium, thallium, tin, lead, antimony, bismuth, gallium, or aluminum. According to embodiments of the disclosure, the layered carbon material can be graphite, carbon nanotube, graphene, or a combination thereof. According to embodiments of the disclosure, the layered carbon material can be intercalated carbon material, such as graphite (including natural graphite, artificial graphite, pyrolytic graphite, foamed graphite, flake graphite, or expanded graphite), graphene, carbon nanotube, or a combination thereof. According to embodiments of the disclosure, the negative electrode 12 can further include a negative electrode current-collecting layer, the negative electrode active material can grow directly on the negative electrode current-collecting layer, and there is no intermediate between the negative electrode active material and the negative electrode current-collecting layer. For example, the negative electrode active material can grow directly on the negative electrode current-collecting layer by chemical vapor deposition (CVD). Furthermore, the negative electrode active material can be affixed to the negative electrode current-collecting layer via an adhesive. The adhesive can be polyvinyl alcohol (PVA), polytetrafluoroethylene (PTFE), carboxymethyl cellulose sodium, polyvinylidene difluoride (PVDF), styrene-butadiene copolymer, fluorinated rubber, polyurethane, polyvinylpyrrolidone, poly(ethyl acrylate), polyvinyl chloride, polyacrylonitrile, polybutadiene, polyacrylic acid, or a combination thereof. According to embodiments of the disclosure, when the positive electrode current-collecting layer is metal material with a porous structure, the positive electrode active material can further fill into the pores of the metal material. According to embodiments of the disclosure, the negative electrode current-collecting layer can include conductive carbon substrate, such as carbon cloth, carbon felt, or carbon paper. For example, the conductive carbon substrate can have a sheet resistance from about 1 $m\Omega \cdot cm^2$ to 6 $m\Omega \cdot cm^2$, and the carbon content of the conductive carbon substrate is greater than 65 wt %. According to embodiments of the disclosure, the negative electrode current-collecting layer can include metal foil or metal material with a porous structure, such as three-dimensional meshwork structure metal material (such as nickel mesh, copper mesh, or molybdenum mesh) or metal material with a foam structure (such as nickel foam, copper foam, or molybdenum foam). In some embodiments, negative electrode current-collecting layer can include lithium mesh, lithium foil, lithium foam, sodium mesh, sodium foil, sodium foam, potassium mesh, potassium foil, potassium foam, beryllium mesh, beryllium foil, beryllium foam, magnesium mesh, magnesium foil, magnesium foam, calcium mesh, calcium foil, calcium foam, scandium mesh, scandium foil, scandium foam, yttrium mesh, yttrium foil, yttrium foam, titanium mesh, titanium foil, titanium foam, zirconium mesh, zirconium foil, zirconium foam, hafnium mesh, hafnium foil, hafnium foam, vanadium mesh, vanadium foil, vanadium foam, niobium mesh, niobium foil, niobium foam, tantalum mesh, tantalum foil, tantalum foam, chromium mesh, chromium foil, chromium foam, molybdenum mesh, molybdenum foil, molybdenum foam, tungsten mesh, tungsten foil, tungsten foam, manganese mesh, manganese foil, manganese, technetium mesh, technetium foil, technetium foam, rhenium mesh, rhenium foil, rhenium foam, iron mesh, iron foil, iron foam, ruthenium mesh, ruthenium foil, ruthenium foam, osmium mesh, osmium foil, osmium foam, cobalt mesh, cobalt foil, cobalt foam, rhodium mesh, rhodium foil, rhodium foam, iridium mesh, iridium foil, iridium foam, nickel mesh, nickel foil, nickel foam, palladium mesh, palladium foil, palladium foam, platinum mesh, platinum foil, platinum foam, copper mesh, copper foil, copper foam, silver mesh, silver foil, silver foam, gold mesh, gold foil, gold foam, zinc mesh, zinc foil, zinc foam, cadmium mesh, cadmium foil, cadmium foam, indium mesh, indium foil, indium foam, thallium mesh, thallium foil, thallium foam, tin mesh, tin foil, tin foam, lead mesh, lead foil, lead foam, antimony mesh, antimony foil, antimony foam, bismuth mesh, bismuth foil, bismuth foam, gallium mesh, gallium foil, gallium foam, aluminum mesh, aluminum foil, aluminum foam, titanium nitride, conductive polymer, or a combination thereof. According to embodiments of the disclosure, the metal material with a porous structure can have a porosity P from about 50% to 80% (such as about 60% or 70%). The porosity P can be determined by the following equation: $P=V1/V2\times100\%$, wherein V1 is the volume of the pores of the negative electrode current-collecting layer, and V2 is the volume of the negative electrode current-collecting layer. According to embodiments of the disclosure, the negative electrode current-collecting layer can be a composite layer of the conductive carbon substrate and a metal material. According to embodiments of the disclosure, when the negative electrode current-collecting layer is metal material with porous structure, the negative electrode active material can further fill into the pores of the metal material. According to embodiments of the disclosure, the negative electrode can consist of the negative electrode current-collecting layer and the negative electrode active material. According to embodiments of the disclosure, the material of the positive electrode 10 and the negative electrode 12 is the same, and the structure of the positive electrode 10 and the negative electrode 12 is the same.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation of Electrolyte Composition

Comparative Preparation Example 1

Aluminum chloride ($AlCl_3$) and 1-butyl-3-methylimidazolium chloride ([BMI$^+$][Cl$^-$]) (serving as ionic liquid) were mixed (the molar ratio of $AlCl_3$ to [BMI$^+$][Cl$^-$] was 1.5:1). The reactants were all transferred from a solid state to a liquid state since the reactants form a eutectic system (i.e. a melt) at room temperature. After stirring the mixture for 12 hours, Electrolyte composition (1) was obtained. Since Electrolyte composition (1) remained in a clear state with good flowability, it means that Electrolyte composition (1) was a eutectic composition.

Comparative Preparation Example 2

First, aluminum chloride ($AlCl_3$) and 1-butyl-3-methylimidazolium chloride ([BMI$^+$][Cl$^-$]) were mixed (the molar ratio of $AlCl_3$ to [BMI$^+$][Cl$^-$] was 1.5:1). Next, 0.38 wt % of naphthalene (commercially available from Aldrich with a trade number of 184500) (hereafter noted as NAP) (based on the total weight of $AlCl_3$ and [BMI$^+$][Cl$^-$]) was added into the mixture. After stirring for 12 hours, Electrolyte composition (2) was obtained. Since Electrolyte composition (2) remained in a clear state with good flowability, it means that Electrolyte composition (2) was a eutectic composition.

Preparation Example 1

First, aluminum chloride ($AlCl_3$) and 1-butyl-3-methylimidazolium chloride ([BMI$^+$][Cl$^-$]) were mixed (the molar ratio of $AlCl_3$ to [BMI$^+$][Cl$^-$] was 1.5:1). Next, 0.38 wt % of 1,10-phenanthroline (commercially available from Alfa Aesar with a trade number of A13163) (hereafter noted as 110PH) (based on the total weight of $AlCl_3$ and [BMI$^+$][Cl$^-$]) was added into the mixture. After stirring for 12 hours, Electrolyte composition (3) was obtained. Since Electrolyte composition (3) remained in a clear state with good flowability, it means that Electrolyte composition (3) was a eutectic composition.

Preparation Example 2

Preparation Example 2 was performed in the same manner as in Preparation Example 1 (the method for preparing Electrolyte composition (3)), except that 1,10-phenanthroline (serving as the additive) was replaced with 1,7-phenanthroline (commercially available from Alfa Aesar with a trade number of 30909) (hereafter noted as 17PH), Electrolyte composition (4) was obtained. Since Electrolyte composition (4) remained in a clear state with good flowability, it means that Electrolyte composition (4) was a eutectic composition.

Preparation Example 3

Preparation Example 3 was performed in the same manner as in Preparation Example 1 (the method for preparing Electrolyte composition (3)), except that 1,10-phenanthroline (serving as the additive) was replaced with 5-chloro-1,10-phenanthroline (commercially available from Alfa Aesar with a trade number of 31180) (hereafter noted as 110PH5Cl), Electrolyte composition (5) was obtained. Since Electrolyte composition (5) remained in a clear state with good flowability, it means that Electrolyte composition (5) was a eutectic composition.

Preparation Example 4

Preparation Example 4 was performed in the same manner as in Preparation Example 1 (the method for preparing Electrolyte composition (3)), except that 1,10-phenanthroline (serving as the additive) was replaced with 8-(4-Dimethylaminophenyl)diazenyl-N,N-diethyl-10-phenylphenazin-10-ium-2-amine chloride (Janus Green B)

(commercially available from Acros with a trade number of Ser. No. 19/680,250) (hereafter noted as JB), Electrolyte composition (6) was obtained. Since Electrolyte composition (6) remained in a clear state with good flowability, it means that Electrolyte composition (6) was a eutectic composition.

Preparation Example 5

Preparation Example 5 was performed in the same manner as in Preparation Example 1 (the method for preparing Electrolyte composition (3)), except that 1,10-phenanthroline (serving as the additive) was replaced with pyridine-3-carboxylic acid (commercially available from Sigma-Aldrich with a trade number of N4126) (hereafter noted as NA), Electrolyte composition (7) was obtained. Since Electrolyte composition (7) remained in a clear state with good flowability, it means that Electrolyte composition (7) was a eutectic composition.

Preparation Example 6

Preparation Example 6 was performed in the same manner as in Preparation Example 1 (the method for preparing Electrolyte composition (3)), except that 1,10-phenanthroline (serving as the additive) was replaced with 4-pyridinecarboxylic acid hydrazide (commercially available from Alfa Aesar with a trade number of A10583) (hereafter noted as INH), Electrolyte composition (8) was obtained. Since Electrolyte composition (8) remained in a clear state with good flowability, it means that Electrolyte composition (8) was a eutectic composition.

Preparation Example 7

Preparation Example 7 was performed in the same manner as in Preparation Example 6 (the method for preparing Electrolyte composition (8)), except that the amount of 4-pyridinecarboxylic acid hydrazide was reduced from 0.38 wt % to 0.05 wt %, Electrolyte composition (9) was obtained. Since Electrolyte composition (9) remained in a clear state with good flowability, it means that Electrolyte composition (9) was a eutectic composition.

Preparation Example 8

Preparation Example 8 was performed in the same manner as in Preparation Example 1 (the method for preparing Electrolyte composition (3)), except that 1,10-phenanthroline (0.38 wt %) was replaced with 4-pyridinecarboxylic acid hydrazide (0.05 wt %) and pyridine-3-carboxylic acid (0.05 wt %), and Electrolyte composition (10) was obtained. Since Electrolyte composition (10) remained in a clear state with good flowability, it means that Electrolyte composition (10) was a eutectic composition.

Preparation Example 9

Preparation Example 9 was performed in the same manner as in Preparation Example 10 (the method for preparing Electrolyte composition (12)), except that 4-pyridinecarboxylic acid hydrazide (0.05 wt %) and pyridine-3-carboxylic acid (0.05 wt %) were replaced with 4-pyridinecarboxylic acid hydrazide (0.38 wt %) and pyridine-3-carboxylic acid (0.38 wt %), and Electrolyte composition (11) was obtained. Since Electrolyte composition (11) remained in a clear state with good flowability, it means that Electrolyte composition (11) was a eutectic composition.

Preparation Example 10

First, aluminum chloride ($AlCl_3$) and 1-butyl-3-methylimidazolium chloride ([$BMI^+$][$Cl^-$]) were mixed (the molar ratio of $AlCl_3$ to [$BMI^+$][$Cl^-$] was 1.5:1). Next, based on the total weight of $AlCl_3$ and [$BMI^+$][$Cl^-$], 0.38 wt % of 4-pyridinecarboxylic acid hydrazide (serving as additive) and 1 wt % of tetrahydrofuran (THF) (serving as solvent) were added into the mixture. After stirring for 12 hours, Electrolyte composition (12) was obtained.

Preparation Example 11

Preparation Example 11 was performed in the same manner as in Preparation Example 10 (the method for preparing Electrolyte composition (12)), except that the amount of tetrahydrofuran was increased from 1 wt % to 5 wt %, obtaining Electrolyte composition (13).

Comparative Preparation Example 3

Aluminum chloride ($AlCl_3$) and 1-ethyl-3-methylimidazolium chloride ([$EMI^+$][$Cl^-$]) (serving as ionic liquid) were mixed (the molar ratio of $AlCl_3$ to [$EMI^+$][$Cl^-$] was 2:1). The reactants were all transferred from a solid state to a liquid state since the reactants form a eutectic system (i.e. a melt) at room temperature. After stirring the mixture for 12 hours, Electrolyte composition (14) was obtained. Since Electrolyte composition (14) remained in a clear state with good flowability, it means that Electrolyte composition (14) was a eutectic composition.

Preparation Example 12

First, aluminum chloride ($AlCl_3$) and 1-ethyl-3-methylimidazolium chloride ([$EMI^+$][$Cl^-$]) (serving as ionic liquid) were mixed (the molar ratio of $AlCl_3$ to [$EMI^+$][$Cl^-$] was 2:1). Next, 0.38 wt % of pyridine-3-carboxylic acid (commercially available from Sigma-Aldrich with a trade number of N4126) (hereafter noted as NA) (based on the total weight of $AlCl_3$ and [$EMI^+$][$Cl^-$]) was added into the mixture. After stirring for 12 hours, Electrolyte composition (15) was obtained. Since Electrolyte composition (15) remained in a clear state with good flowability, it means that Electrolyte composition (15) was a eutectic composition.

Preparation Example 13

Preparation Example 13 was performed in the same manner as in Preparation Example 12 (the method for preparing Electrolyte composition (15)), except that the amount of pyridine-3-carboxylic acid was increased from 0.38 wt % to 10 wt %, Electrolyte composition (16) was obtained. Since Electrolyte composition (16) remained in a clear state with good flowability, it means that Electrolyte composition (16) was a eutectic composition.

Preparation Example 14

Preparation Example 14 was performed in the same manner as in Preparation Example 12 (the method for preparing Electrolyte composition (15)), except that the pyridine-3-carboxylic acid (0.38 wt %) was replaced with 8-(4-Dimethylaminophenyl)diazenyl-N,N-diethyl-10-phenylphenazin-10-ium-2-amine chloride (Janus Green B) 10 wt %, Electrolyte composition (17) was obtained. Since Electrolyte composition (17) remained in a clear state with good flowability, it means that Electrolyte composition (17) was a eutectic composition.

Preparation Example 15

Preparation Example 15 was performed in the same manner as in Preparation Example 14 (the method for preparing Electrolyte composition (17)), except that the amount of Janus Green B was increased from 10 wt % to 15 wt %, Electrolyte composition (18) was obtained. Since Electrolyte composition (18) remained in a clear state with good flowability, it means that Electrolyte composition (18) was a eutectic composition.

Preparation Example 16

Preparation Example 16 was performed in the same manner as in Preparation Example 14 (the method for preparing Electrolyte composition (17)), except that the amount of Janus Green B was increased from 10 wt % to 20 wt %, Electrolyte composition (19) was obtained. Since Electrolyte composition (19) remained in a clear state with good flowability, it means that Electrolyte composition (19) was a eutectic composition.

Preparation Example 17

Preparation Example 17 was performed in the same manner as in Preparation Example 14 (the method for preparing Electrolyte composition (17)), except that the amount of Janus Green B was increased from 10 wt % to 25 wt %, Electrolyte composition (20) was obtained. Electrolyte composition (20) has good flowability, but the electrolyte composition became turbid and a precipitate formed. It means that Electrolyte composition (20) was not a eutectic composition and could not be used in the battery.

Metal-Ion Battery

Comparative Example 1

First, an aluminum foil (with a thickness of 0.05 mm, manufactured by Alfa Aesar) was cut to obtain the negative electrode (having a size of 20 mm×20 mm). A nickel foam sheet (having a size of 100 mm×100 mm, a thickness of 0.2 mm, a porosity of 90%, and a pore diameter of 200 m) was provided. Next, the nickel foam sheet was disposed in a vacuum muffle furnace, and then hydrogen gas, argon gas (serving as carrier gas), and methane gas were introduced into the vacuum muffle furnace to perform a graphite vapor deposition (at a temperature of 900° C. to 1100° C.), obtaining a graphite material (nickel foam sheet with a graphite layer covering the surface thereof) with a graphite loading amount of about 800-1500 mg. Next, the graphite material was cut to obtain the positive electrode (i.e. graphite electrode) (having a size of 20 mm×20 mm). Next, a separator (a glass filter paper with trade No. Whatman GF/C) was provided. Next, the negative electrode, the separator, and the positive electrode were placed in sequence and sealed within an aluminum plastic pouch. Next, Electrolyte composition (1) was injected into the aluminum plastic pouch, obtaining Metal-ion battery (1).

Next, Metal-ion battery (1) was subjected to a charge-discharge testing (charged to about 2.3 V) by NEWARE battery analyzer (BST408-5V-10 A) with a current of 500 mA/g to analyze the Coulombic efficiency of Metal-ion battery (1), and the capacity retentions on the $2000^{th}$ charging/discharging cycle and the $3000^{th}$ charging/discharging cycle. Further, the number of the charging/discharging cycles was determined when the discharging capacity of Metal-ion battery (1) was lower than 80%. The results are shown in Table 1.

Comparative Example 2

Comparative Example 2 was performed in the same manner as Comparative Example 1 (the method for fabricating the Metal-ion battery (1)) except that Electrolyte composition (1) was replaced with Electrolyte composition (2), obtaining Metal-ion battery (2).

Next, Metal-ion battery (2) was subjected to the aforementioned charge-discharge testing to analyze the Coulombic efficiency of Metal-ion battery (2), and the capacity retentions on the $2000^{th}$ charging/discharging cycle and the $3000^{th}$ charging/discharging cycle. Further, the number of the charging/discharging cycles was determined when the discharging capacity of Metal-ion battery (2) was lower than 80%. The results are shown in Table 1.

Examples 1-9

Examples 1-9 were performed in the same manner as Comparative Example 1 (the method for fabricating the Metal-ion battery (1)) except that Electrolyte composition (1) was replaced with Electrolyte compositions (3)-(11) individually, obtaining Metal-ion batteries (3)-(11).

Next, Metal-ion batteries (3)-(11) were subjected to the aforementioned charge-discharge testing to analyze the Coulombic efficiency of Metal-ion batteries (3)-(11), and the capacity retentions on the $2000^{th}$ charging/discharging cycle and the $3000^{th}$ charging/discharging cycle. Further, the number of the charging/discharging cycles was determined when the discharging capacity of Metal-ion batteries (3)-(11)) were lower than 80%. The results are shown in Table 1.

TABLE 1

| Example/Comparative Example | additive | amount of additive (wt %) | capacity retention on $2000^{th}$ cycle (%) | capacity retention on $3000^{th}$ cycle (%) | the number of the charging/discharging cycles when the discharging capacity lower than 80% | Coulombic efficiency (%) |
|---|---|---|---|---|---|---|
| Comparative Example 1 | — | — | 30.2 | 19.9 | 668 | 98.0 |
| Comparative Example 2 | NAP | 0.38% | 36.1 | 18.4 | 773 | 98.0 |
| Example 1 | 110PH | 0.38% | 51.1 | 24.3 | 1015 | 99.6 |
| Example 2 | 17PH | 0.38% | 72.9 | 63.3 | 1531 | 98.7 |

TABLE 1-continued

| Example/Comparative Example | additive | amount of additive (wt %) | capacity retention on 2000$^{th}$ cycle (%) | capacity retention on 3000$^{th}$ cycle (%) | the number of the charging/discharging cycles when the discharging capacity lower than 80% | Coulombic efficiency (%) |
|---|---|---|---|---|---|---|
| Example 3 | 110PH5Cl | 0.38% | 83.2 | 59.5 | 2111 | 99.2 |
| Example 4 | JB | 0.38% | 67.4 | 52.4 | 1320 | 98.8 |
| Example 5 | NA | 0.38% | 84.0 | 61.0 | 2109 | 99.4 |
| Example 6 | INH | 0.38% | 83.1 | 64.2 | 2154 | 99.3 |
| Example 7 | INH | 0.05% | 93.0 | 77.0 | 2793 | 99.9 |
| Example 8 | INH/NA | 0.05%/0.05% | 74.0 | 22.2 | 1789 | 99.1 |
| Example 9 | INH/NA | 0.38%/0.38% | 68.5 | 50.2 | 1535 | 99.2 |

As shown in Table 1, in comparison with Comparative Example 1 and Comparative Example 2, the batteries as disclosed in Examples 1-11 exhibit enhanced Coulombic efficiency. It means that the deposition/dissolution uniformity of the metal electrode is improved when the nitrogen-containing heterocyclic compound additive is added into the electrolyte composition. Therefore, the metal-ion battery, employing the electrolyte composition, can have enhanced characteristics and prolonged lifespan.

Example 10

Example 10 was performed in the same manner as Comparative Example 1 (the method for fabricating the Metal-ion battery (1)) except that Electrolyte composition (1) was replaced with Electrolyte composition (12), obtaining Metal-ion battery (12).

Next, Metal-ion battery (12) was subjected to the aforementioned charge-discharge testing to analyze the Coulombic efficiency of Metal-ion battery (12), and the capacity retentions at the 2000$^{th}$ charging/discharging cycle and the 3000$^{th}$ charging/discharging cycle. Further, the number of the charging/discharging cycles was determined when the discharging capacity of Metal-ion battery (12) was lower than 80%. The results show below: Metal-ion battery (12) has a Coulombic efficiency of 99.6%, the capacity retentions on the 2000$^{th}$ charging/discharging cycle and the 3000$^{th}$ charging/discharging cycle are 77.6% and 55.5% respectively, and the discharging capacity was lower than 80% on the 1887$^{th}$ charging/discharging cycle.

Example 11

Example 11 was performed in the same manner as Comparative Example 1 (the method for fabricating the Metal-ion battery (1)) except that Electrolyte composition (1) was replaced with Electrolyte composition (13), obtaining Metal-ion battery (13).

Next, Metal-ion battery (13) was subjected to the aforementioned charge-discharge testing to analyze the Coulombic efficiency of Metal-ion battery (13), and the capacity retentions on the 2000$^{th}$ charging/discharging cycle and the 3000$^{th}$ charging/discharging cycle. Further, the number of the charging/discharging cycles was determined when the discharging capacity of Metal-ion battery (13) was lower than 80%. The results show below: Metal-ion battery (13) has a Coulombic efficiency of 99.2%, the capacity retentions on the 2000$^{th}$ charging/discharging cycle and the 3000$^{th}$ charging/discharging cycle are 77.8% and 56.5% respectively, and Coulombic efficiency was lower than 80% on the 1966$^{th}$ charging/discharging cycle.

Comparative Example 3

Comparative Example 3 was performed in the same manner as Comparative Example 1 (the method for fabricating the Metal-ion battery (1)) except that Electrolyte composition (1) was replaced with Electrolyte composition (14), obtaining Metal-ion battery (14).

Next, Metal-ion battery (14) was subjected to the aforementioned charge-discharge testing to analyze the Coulombic efficiency of Metal-ion battery (14), and the capacity retentions on the 2000$^{th}$ charging/discharging cycle and the 3000$^{th}$ charging/discharging cycle. Further, the number of the charging/discharging cycles was determined when the discharging capacity of Metal-ion battery (14) was lower than 80%. The results are shown in Table 2.

Examples 12-16

Examples 12-16 were performed in the same manner as Comparative Example 1 (the method for fabricating the Metal-ion battery (1)) except that Electrolyte composition (1) was replaced with Electrolyte compositions (15)-(19) individually, obtaining Metal-ion batteries (15)-(19).

Next, Metal-ion batteries (15)-(19) were subjected to the aforementioned charge-discharge testing to analyze the Coulombic efficiency of Metal-ion batteries (15)-(19), and the capacity retentions on the 2000$^{th}$ charging/discharging cycle and the 3000$^{th}$ charging/discharging cycle. Further, the number of the charging/discharging cycles was determined when the discharging capacity of Metal-ion batteries (15)-(19)) were lower than 80%. The results are shown in Table 2.

TABLE 2

| Example/Comparative Example | additive | amount of additive (wt %) | capacity retention on 2000$^{th}$ cycle (%) | capacity retention on 3000$^{th}$ cycle (%) | the number of the charging/discharging cycles when the discharging capacity lower than 80% | Coulombic efficiency (%) |
|---|---|---|---|---|---|---|
| Comparative Example 3 | — | — | 16.1 | 8.0 | 252 | 84.8 |

TABLE 2-continued

| Example/Comparative Example | additive | amount of additive (wt %) | capacity retention on 2000$^{th}$ cycle (%) | capacity retention on 3000$^{th}$ cycle (%) | the number of the charging/discharging cycles when the discharging capacity lower than 80% | Coulombic efficiency (%) |
|---|---|---|---|---|---|---|
| Example 12 | NA | 0.38 | 51.9 | 35.5 | 376 | 88.9 |
| Example 13 | NA | 10 | 70.1 | 51.5 | 1742 | 94.9 |
| Example 14 | JB | 10 | 81.9 | 56.5 | 2117 | 97.0 |
| Example 15 | JB | 15 | 93.0 | 89.7 | 3381 | 98.2 |
| Example 16 | JB | 20 | 93.9 | 87.1 | 3936 | 90.7 |

Figure 2:
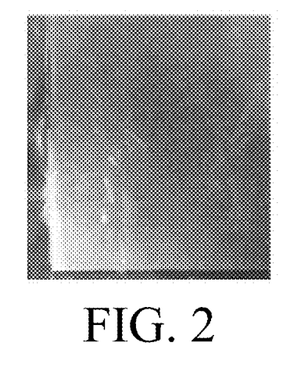
FIG. 2 is a photograph of the surface of the original aluminum foil.
Figure 3:
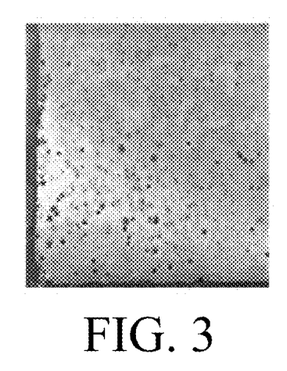
FIG. 3 is a photograph of the surface of the aluminum negative electrode of Metal-ion battery (1) as disclosed in Comparative Example 1 after 3000 charging/discharging cycles.
Figure 4:
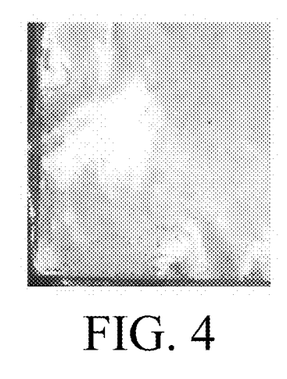
FIG. 4 is a photograph of the surface of the aluminum negative electrode of Metal-ion battery (8) as disclosed in Example 6 after 3000 charging/discharging cycles.

The initial aluminum foil of the negative electrode of the metal-ion battery, the aluminum negative electrode of Metal-ion battery (1) after 3000 charging/discharging cycles, and aluminum negative electrode of Metal-ion battery (8) after 3000 charging/discharging cycles were subjected to SEM (electronic scanner microscope) analysis (SEM; Model name: SU-8010, HITACHI society manufacture) and the photographs of the surface of the aluminum foils were shown in FIGS. 2-4 individually. As shown in FIGS. 2-4, the initial aluminum foil has a smooth surface before use. After the assembly of battery and then performing 3000 charging/discharging cycles, the aluminum electrode of the battery would have an uneven surface and corrosion pits are produced on the surface of the aluminum electrode when the electrolyte composition is in the absence of additive. In addition, the aluminum electrode of the battery would have a smooth surface after performing 3000 charging/discharging cycles, when the electrolyte composition is in the presence of additive. It means that, due to the addition of the nitrogen-containing heterocyclic compound additive of the disclosure in the composition, the deposition/dissolution uniformity of the metal electrode and the self-corrosion effect of the surface of the aluminum electrode are improved during the charging/discharging cycles of the metal-ion battery (such as aluminum-ion battery).

It will be clear that various modifications and variations can be made to the disclosed methods and materials. It is intended that the specification and examples be considered as exemplary only, with the true scope of the disclosure being indicated by the following claims and their equivalents.

What is claimed is:
1. An electrolyte composition, comprising:
a metal salt, wherein the metal salt has a structure represented by Formula (I)

$$M_iX_j \quad \text{Formula (I)},$$

wherein M is lithium ion, sodium ion, potassium ion, beryllium ion, magnesium ion, calcium ion, scandium ion, yttrium ion, titanium ion, zirconium ion, hafnium ion, vanadium ion, niobium ion, tantalum ion, chromium ion, molybdenum ion, tungsten ion, manganese ion, technetium ion, rhenium ion, iron ion, ruthenium ion, osmium ion, cobalt ion, rhodium ion, iridium ion, nickel ion, palladium ion, platinum ion, copper ion, silver ion, gold ion, zinc ion, cadmium ion, mercuric ion, indium ion, thallium ion, tin ion, lead ion, arsenic ion, antimony ion, bismuth ion, gallium ion, or aluminum ion; X is $F^-$, $Cl^-$, $Br^-$, $I^-$, $BF_4^-$, $PF_6^-$, $[(CF_3SO_2)_2N]^-$, $CF_3SO_3^-$, $NO_3^-$, $CH_3CO_2^-$, $SO_4^{2-}$, $C_2O_4^{2-}$, or $[B(C_2O_4)_2]^-$; and, i is 1, 2, 3, 4, 5, or 6; j is 1, 2, 3, 4, 5, or 6;
an ionic liquid; and
an additive, wherein the additive comprises substituted or unsubstituted $C_5$-$C_{30}$ nitrogen-containing heterocyclic compound, wherein the substituted $C_5$-$C_{30}$ nitrogen-containing heterocyclic compound is 3,4,7,8-tetramethyl-1,10-phenanthroline, 5,6-dimethyl-1,10-phenanthroline, or a $C_5$-$C_{30}$ nitrogen-containing heterocyclic compound which has at least one hydrogen atom bonded to the carbon atom of the compound that is replaced with R, wherein R is halogen, cyano group, $C_{1-10}$ alkoxy group, $C_{1-5}$ aminoalkyl group, —$NR^1R^2$, and wherein $R^1$, $R^2$, $R^4$, $R^5$, $R^6$, $R^7$, $R^8$, $R^9$, and $R^{10}$ are independently hydrogen or $C_{1-10}$ alkyl group, and $R^3$ is hydrogen; and the unsubstituted $C_5$-$C_{30}$ nitrogen-containing heterocyclic compound is pyrrole, pyrazole, imidazole, oxazole, isoxazole, thiazole, benzimdazole, pyridine, indole, indoline, carbazole, pyridazine, pyrimidine, pyrazine, purine, acridine, phenothiazine, quinolone, iso-quinolone, pteridine, 1,10-phenanthroline, 1,7-phenanthroline, 4,7-phenanthroline or a combination thereof.

2. The electrolyte composition as claimed in claim 1, wherein the molar ratio of the metal salt to the ionic liquid is from 1.0 to 2.05.

3. The electrolyte composition as claimed in claim 1, wherein the amount of additive is from 0.05 wt % to 20 wt %, based on the total weight of the metal salt and the ionic liquid.

4. The electrolyte composition as claimed in claim 1, wherein the additive comprises 4,7-dihydroxy-1,10-phenanthroline, 5-chloro-1,10-phenanthroline, 1,10-phenanthroline-5,6-dione, 1,10-phenanthroline monohydrate, 1,10-phenanthroline monohydrochloride monohydrate, 4-pyridinecarboxylic acid hydrazide, 3-pyridinecarboxylic acid hydrazide, 4-pyridyl hydrazide, 4-pyridinecarboxaldehyde, 4-methoxypyridine, 3-methoxypyridine, 2-methoxypyridine, 4-aminopyridine, 4-(aminomethyl)pyridine, pyridine-4-carboxamide, pyridine-3-carboxamide, pyridine-2-carboxamide, pyridine-3-carboxylic acid, 8-(4-Dimethylaminophenyl)diazenyl-N,N-diethyl-10-phenylphenazin-10-ium-2-amine chloride (Janus Green B), or a combination thereof.

5. The electrolyte composition as claimed in claim 1, wherein the ionic liquid has a structure represented by Formula (II);

$$[A]_k[B]_l \quad \text{Formula (II)},$$

wherein A is imidazolium cation, pyrrolium cation, pyrrolinium cation, pyrrolidinium cation, pyridinium cation, ammonium cation, indazolium cation, pyrimidinium cation, azaannulenium cation, azathiazolium cation, benzimidazolium cation, benzofuranium cation, benzotriazolium cation, borolium cation, cholinium cation, cinnolinium cation, diazabicyclodecenium cation, diazabicyclononenium cation, diazabicyclo-undecenium cation, dithiazolium cation, furanium cation, guanidinium cation, indolinium cation, indolium cation, morpholinium cation, oxaborolium cation, oxaphospholium cation, oxazinium cation, oxazolium cation, iso-oxazolium cation, oxathiazolium cation, phospholium cation, phosphonium cation, phthalazinium cation, piperazinium cation, piperidinium cation, pyranium cation, pyrazinium cation, pyrazolium cation, pyridazinium cation, quinazolinium cation, quinolinium cation, iso-quinolinium cation, quinoxalinium cation, selenozolium cation, sulfonium cation, tetrazolium cation, iso-thiadiazolium cation, thiazinium cation, thiazolium cation, thiophenium cation, thiuronium cation, triazadecenium cation, triazinium cation, triazolium cation, iso-triazolium cation, or uronium cation; B is $F^-$, $Cl^-$, $Br^-$, $I^-$, $BF_4^-$, $PF_6^-$, $[(CF_3SO_2)_2N]^-$, $CF_3SO_3^-$, $NO_3^-$, $CH_3CO_2^-$, $SO_4^{2-}$, $C_2O_4^{2-}$, or $[B(C_2O_4)_2]^-$; and, k is 1, 2, 3, 4, 5, or 6; l is 1, 2, 3, 4, 5, or 6.

6. The electrolyte composition as claimed in claim 1, further comprising a solvent.

7. A metal-ion battery, comprising:
a positive electrode;
a separator;
a negative electrode, wherein the negative electrode is separated from the positive electrode by the separator; and
the electrolyte composition as claimed in claim 1 disposed between the positive electrode and the negative electrode.

8. The metal-ion battery as claimed in claim 7, wherein the positive electrode comprises a positive electrode active material and a positive electrode current-collecting layer.

9. The metal-ion battery as claimed in claim 8, wherein the positive electrode current-collecting layer comprises a conductive carbon substrate, a metal material, a metal material with a porous structure, or a combination thereof.

10. The metal-ion battery as claimed in claim 7, wherein the positive electrode active material is layered carbon material, layered double hydroxide, layered oxide, layered chalcogenide, vanadium oxide, metal sulfide, or a combination thereof.

11. The metal-ion battery as claimed in claim 7, wherein the negative electrode comprises a negative electrode active material.

12. The metal-ion battery as claimed in claim 11, wherein the negative electrode active material comprises a metal or an alloy of the metal, layered carbon material, layered double hydroxide, layered oxide, layered chalcogenide, vanadium oxide, metal sulfide, or a combination thereof.

13. The metal-ion battery as claimed in claim 12, wherein the metal is sodium, potassium, beryllium, magnesium, calcium, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, indium, thallium, tin, lead, antimony, bismuth, gallium, or aluminum.

14. The metal-ion battery as claimed in claim 11, wherein the negative electrode further comprises a negative electrode current-collecting layer, the negative electrode current-collecting layer comprises a conductive carbon substrate, lithium mesh, lithium foil, lithium foam, sodium mesh, sodium foil, sodium foam, potassium mesh, potassium foil, potassium foam, beryllium mesh, beryllium foil, beryllium foam, magnesium mesh, magnesium foil, magnesium foam, calcium mesh, calcium foil, calcium foam, scandium mesh, scandium foil, scandium foam, yttrium mesh, yttrium foil, yttrium foam, titanium mesh, titanium foil, titanium foam, zirconium mesh, zirconium foil, zirconium foam, hafnium mesh, hafnium foil, hafnium foam, vanadium mesh, vanadium foil, vanadium foam, niobium mesh, niobium foil, niobium foam, tantalum mesh, tantalum foil, tantalum foam, chromium mesh, chromium foil, chromium foam, molybdenum mesh, molybdenum foil, molybdenum foam, tungsten mesh, tungsten foil, tungsten foam, manganese mesh, manganese foil, manganese, technetium mesh, technetium foil, technetium foam, rhenium mesh, rhenium foil, rhenium foam, iron mesh, iron foil, iron foam, ruthenium mesh, ruthenium foil, ruthenium foam, osmium mesh, osmium foil, osmium foam, cobalt mesh, cobalt foil, cobalt foam, rhodium mesh, rhodium foil, rhodium foam, iridium mesh, iridium foil, iridium foam, nickel mesh, nickel foil, nickel foam, palladium mesh, palladium foil, palladium foam, platinum mesh, platinum foil, platinum foam, copper mesh, copper foil, copper foam, silver mesh, silver foil, silver foam, gold mesh, gold foil, gold foam, zinc mesh, zinc foil, zinc foam, cadmium mesh, cadmium foil, cadmium foam, indium mesh, indium foil, indium foam, thallium mesh, thallium foil, thallium foam, tin mesh, tin foil, tin foam, lead mesh, lead foil, lead foam, antimony mesh, antimony foil, antimony foam, bismuth mesh, bismuth foil, bismuth foam, gallium mesh, gallium foil, gallium foam, aluminum mesh, aluminum foil, aluminum foam, titanium nitride, conductive polymer, or a combination thereof.

15. The metal-ion battery as claimed in claim 7, the separator is glass fiber, polyethylene (PE), polypropylene (PP), nonwoven fabric, wood fiber, poly(ether sulfones) (PES), ceramic fiber, or a combination thereof.

* * * * *